July 23, 1929.  S. W. WIDNEY  1,722,069
APPARATUS FOR CHARTING THE RIDING QUALITIES OF VEHICLES
Filed Sept. 22, 1923
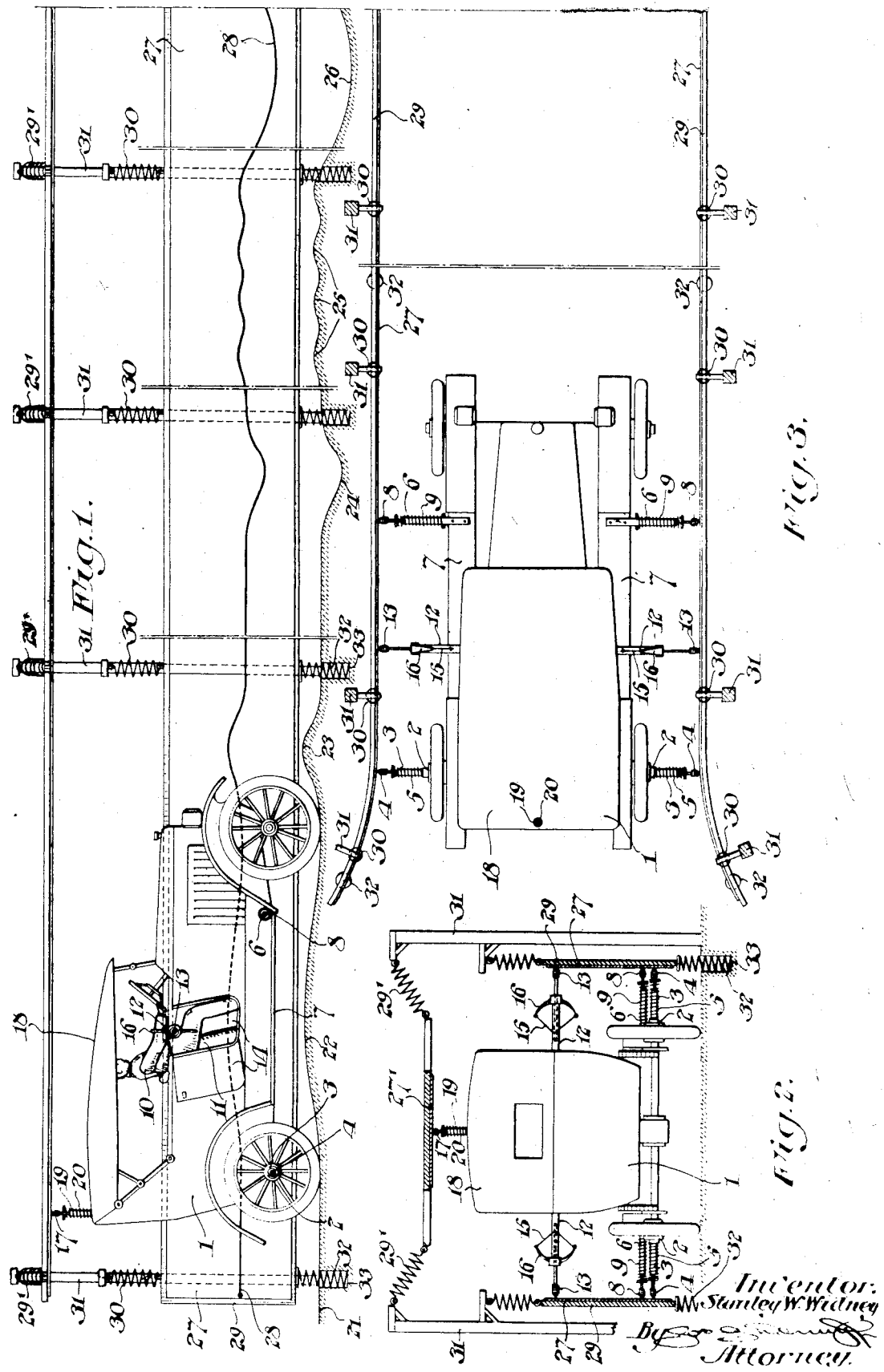

Patented July 23, 1929.

1,722,069

UNITED STATES PATENT OFFICE.

STANLEY W. WIDNEY, OF PHILADELPHIA, PENNSYLVANIA.

APPARATUS FOR CHARTING THE RIDING QUALITIES OF VEHICLES.

Application filed September 22, 1923. Serial No. 664,184.

My invention is designed to provide means for obtaining data indicating the effects of road shocks and the like upon vehicles and the parts thereof and permit the accurate determination of the relative ridability of a vehicle under varying conditions or of different vehicles under similar conditions. The lack of such accurate and comparable data has heretofore hampered the scientific development of wheel, spring and seat constructions since the determination of the effect of changes in such constructions upon the riding qualities of vehicles has heretofore been largely dependent upon personal opinions.

In the practice of my invention, there is provided a test surface or way containing typical highway defects or obstructions, and the effect of such defects or obstructions upon the various parts of the vehicle are recorded by a marker or markers carried by the vehicle upon a chart paralleling the line of travel and preferably having thereon a datum line conforming to the contour of the surface of the way or road over which the vehicle travels.

The markers may be connected with such parts of the vehicle as are necessary to indicate the modifying influence of the various resilient vehicle members tending to absorb shocks. For instance, a marker may be carried by a wheel hub to indicate the modifying influence of the tire and members transmitting the load to the axle; another marker may be connected with the chassis or body to indicate the modifying influence of the vehicle springs; another marker may be connected with a dummy on a seat to indicate the modifying influence of the upholstery; and another marker may be connected with the top to indicate side sway. By comparative study of data thus obtained, the determination of the factors tending to produce stability and the transportation of a vehicle occupant in the desired substantially constant plane, without bumps or swaying, is facilitated. Such comparative study may be made from the charts themselves; from reduced reproductions thereof; or from mathematical deductions derived from the charts.

The accompanying drawings illustrate the application of my invention to the determination of the riding qualities of a motor vehicle. In the drawings, Fig. 1 is an elevation of a way, chart and vehicle suitable for the practice of my invention; Fig. 2 is an end view thereof; and Fig. 3 is a top plan view with the horizontal chart removed.

As illustrated in the drawings, a usual form of motor vehicle 1 has secured to wheel hubs 2 thereof the tubes 3 for supporting the markers 4, which are normally pressed outwardly by the coiled springs 5. Similar tubes 6 are secured upon the running boards 7 and support markers 8 normally pressed outward by coiled springs 9. A device such as a dummy 10, of such weight as to simulate a passenger, is seated upon the spring cushion 11 and has fixed thereto a tubular support 12 for a marker 13, which is normally pressed outward through the open door 14 by the cords 15 and bowed elastic strips 16. A marker 17 is connected with the top 18 through the tube 19 and spring 20.

A way or test course 21 is provided with typical defects and obstructions, such as the hump 22, "thank you ma'am" 23, hole 24, "wash-board" ridges 25 and depression 26.

Charts 27, preferably provided with a datum line 28 conforming with the contour of the surface of the way 21, are carried by the supports 29 along the sides of the way 21 and in the paths of the markers 4, 8, and 13. The chart supports may be suspended vertically from elastic hangers 30 depending from posts 31 and have their lower ends controlled by elastic tie members 32 anchored in the recesses 33. A further chart 27' may be supported horizontally above the vehicle by a member 29' connected with the posts 31. At the entrance to the way 21, the chart supports are preferably flared so as to provide gradual contact of the markers with the charts.

It will be understood that when suitably cross-lined charts have been fixed in position with the datum lines 28 thereon in correspondence with the contour of the surface of the way, a vehicle with its markers in place is driven at suitable speed along the way. The markers record upon the charts the exact movements of the wheel hubs, body, seat and top, thereby clearly showing the effects of the several defects and obstructions in the road upon the various parts of the vehicle, and the modifying influence of the tires, wheels, springs and upholstery. By comparative tests over standardized ways accurate conclusions may be reached as to the comparative riding qualities of various vehicles and as to modifications of construction necessary to improve such riding qualities.

Having described my invention, I claim:

1. The means for obtaining data indicating the effect of road shocks and the like upon vehicles or parts thereof which comprises the combination with a vehicle way, and a vehicle of a chart extending along said way, and a marker carried by said vehicle in contact with said chart.

2. The means for obtaining data indicating the effect of road shocks or the like upon vehicles or parts thereof which comprises the combination with a vehicle and a way having a known contour, of a chart provided with a datum line conforming with the contour of said way, and a marker carried by said vehicle said marker contacting with and recording its movements upon said chart, said chart being supported independently of the vehicle.

3. The means for determining the riding qualities of vehicles which comprises the combination with a vehicle and an uneven way, of a yieldingly supported chart extending along said way, and a marker connected carried by said vehicle and engaging said chart.

4. The means for determining the riding qualities of vehicles which comprises the combination with a vehicle and a way, of a chart extending along said way, and a yieldingly supported marker connected with said vehicle and engaging said chart.

5. The means for obtaining data indicating the effect of road shocks or the like upon vehicles or parts thereof which comprises the combination with a vehicle and an uneven way, a chart extending along said way, and markers connected with relatively movable parts of said vehicle, said markers contacting with and recording the movements of the respective parts upon said chart.

In witness whereof I have hereunto set my name this 19th day of September, 1923.

STANLEY W. WIDNEY.